United States Patent Office 3,032,522
Patented May 1, 1962

3,032,522
POLYMER CONTAINING A PLURALITY OF CARBOXYL GROUPS AND A PLURALITY OF 2-THIAZYL GROUPS, THERMALLY REVERSIBLE GELS THEREOF, AND METHOD FOR PREPARATION
Robert M. Summers, Scotia, N.Y., assignor to The B. F. Goodrich Company, New York, N.Y., a corporation of New York
No Drawing. Filed Dec. 8, 1958, Ser. No. 778,567
7 Claims. (Cl. 260—29.6)

This invention relates to novel synthetic water-soluble polymers and more particularly pertains to synthetic water-soluble polymers and their salts which are characterized by their ability to form thermally reversible gels when dissolved in water and to methods for preparing said polymers and gels.

It is well known that gelatin has the unique ability to dissolve in water, in certain concentrations, to form solutions which are both relatively thin and pourable at elevated temperatures and relatively thick and non-pourable or semi-solid gels at room temperature and below. This unique property of thermal reversibility inherent in gelatin solutions is used to advantage in numerous applications involving coating, adhesives, dipping, suspending of particles, stabilizing emulsions and the like. Gelatin has the disadvantage of being a natural protein and by its nature is subject to attack and degradation by bacteria, fungus and the like which makes it necessary to employ inhibitors in most formulations containing gelatin. Gelatins also have the disadvantage inherent in most natural products, namely, lack of uniformity in physical properties from one lot to another and chain scission due to hydrolysis. Because of this lack of uniformity it is often necessary to conduct costly control tests and blending procedures in order to produce consistently a gelatin having properties falling within a given specified range.

There has been a long felt need for a synthetic, uniform, thermally reversible, water-soluble polymer and numerous workers in the field have attempted to prepare such a polymer.

Accordingly, an object of the present invention is the provision of a synthetic, water-soluble polymer and salts thereof which form truly thermally reversible gels in water. Another object is the provision of a synthetic water-soluble polymer and salts thereof which are capable of forming thermally reversible gels in water and are not subject to degradative attack by bacteria or fungus because of their synthetic nature. Another object is the provision of a synthetic water-soluble polymer and salts thereof capable of forming thermally reversible gels in water at concentrations of said polymer amounting to only a fraction of the concentrations of gelatin required for forming similar gels. Still another object is the provision of a water-soluble polymer and salts thereof which can be blended with gelatin and other natural water-soluble proteins to form thermally reversible gels in water. Yet another object is the provision of a method for preparing synthetic water-soluble polymers and salts thereof of uniform and reproducible compositions and properties, said polymers being capable of forming thermally reversible gels in water. Another object is the provision of novel thermally reversible aqueous gels.

Still further objects and advantages of the present invention will appear from the more detailed description set forth below, it being understood that such detailed description is given by way of illustration and explanation only, and not by way of limitation, since various changes therein may be made by those skilled in the art without departing from the scope and spirit of the present invention.

I have discovered a novel composition of matter characterized by the fact that it forms thermally reversible gels in water, said composition comprising a polymer containing a plurality of amide group of the type specified herein and carboxyl groups.

The polymers embodied in the present invention comprise those containing the structure

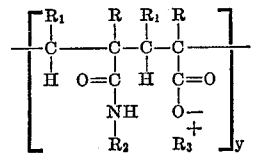

wherein R represents hydrogen, chlorine, fluorine, bromine, a cyano group, an alkyl group having from 1 to about 10 carbon atoms, an aryl group, an aralkyl group or an alkaryl group and $R_1$ represents hydrogen, chlorine, bromine and fluorine, $R_2$ can be an azole group and $R_3^+$ is a cation such as hydrogen, $NH_4$ and an alkali metal such as lithium, sodium, potassium, and rubidium, $R_2NH_3^+$ wherein $R_2$ has the above designation, an aliphatic amine such as dimethyl amine, methyl amine, ethyl amine, propyl amine, n-butylamine, dibutyl amine, and an amino alcohol such as ethanol amine, diethanol amine and triethanol amine and the like, $y$ is a whole number greater than 1.

The aminoazole moieties useful in the amide portion of the foregoing polymer structure in this invention are the monoamino thiazoles, oxazoles and imidiazoles and the most preferred are the 2-aminothiazoles, the 2-aminooxazoles and the 2-aminoimidazoles such as 2-aminothiazole itself, 2-amino-4-methylthiazole, 2-amino-4-ethylthiazole, 2-amino-4,5-dimethylthiazole, 2-amino-4,5-diethylthiazole, 2-amino-4-methyl-5-ethylthiazole, 2-amino-4-n-propylthiazole, 2-amino-4-n-butylthiazole and the like, 2-aminooxazole itself, 2-amino-4-methyloxazole, 2-amino-4,5-dimethyloxazole, 2-amino-4-ethyloxazole, 2-amino-4,5-diethyloxazole, 2-amino-4-n-butyloxazole and the like, 2-aminoimidazole itself, 2-amino-4-methylimidazole, 2-amino-5-methylimidazole, 2-amino-4,5-dimethylimidazole, 2-amino-4,5-diethylimidazole, 2-amino-5-n-butylimidazole and the like and others. Preferred are the 2-aminothiazoles and most preferred is 2-aminothiazole itself.

The following list of structural formulas will further illustrate the types of aminoazoles useful in forming the amide groups present in the polymers embodied in this invention.

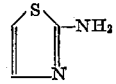

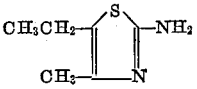

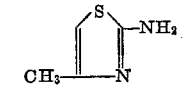

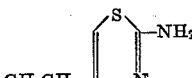

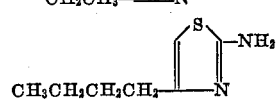

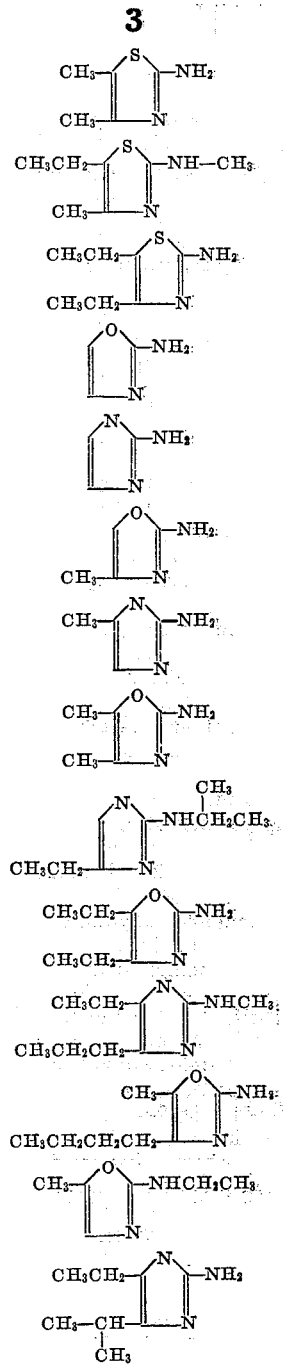

The polymers embodied in the present invention are prepared preferably by converting a polymeric anhydride to its partial amide by reaction with an aminoazole. The most preferred polymers in this invention are those having at least 2.5% by weight of chemically bound 2-aminoazole groups in them.

The preferred polymeric anhydrides are the polymeric anhydrides of alpha,beta-olefinically unsaturated monocarboxylic acids or acrylic or substituted acrylic acids having a series of recurring

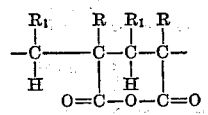

units as described more fully in Italian Patent No. 563,941, granted to The B. F. Goodrich Company on June 7, 1957. In the above formula R and $R_1$ have the aforementioned designations. Thus, the polymer is a partial amide of polyacrylic acid or an alpha substituted derivative thereof.

For the purposes of the present invention the partial N-thiazylamides of polymeric acrylic anhydride are most preferred.

Polyacrylic anhydride or a polymeric anhydride of an alpha substituted acrylic acid reacts with an aminoazole. The anhydride group is ruptured and the reaction is controlled so that only one of the acyl groups is amidified and the other acyl group becomes a carboxylic acid group or the salt of a carboxylic acid group.

The polymeric anhydrides of acrylic or alpha substituted acrylic acids are converted to their partial azoleamides by treating them with an aminoazole or a mixture of aminoazoles in solution or suspension at temperatures ranging from about 25° C. and lower to about 100° C. and higher.

The preferred method for preparing the compositions of this invention is the reaction of the anhydride polymer with the aminoazole in a mutual solvent at temperatures in the range of from about 50° C. to about 100° C.

According to the preferred method the polymeric anhydride and the aminoazole are dissolved in a polar organic solvent such as, but not limited to, dimethyl formamide, gamma-butyrolactone, N-methyl pyrrolidone and dimethyl sulfoxide and the like. The formation of the partial amide is completed in the solvent and the polymeric partial amide is precipitated and dried. The proportion of amide groups present in the resulting product is determined by the proportion of anhydride groups present in the original polymer and the amount of aminoazole employed in the amidification reaction. From as little as 1% to as much as 50% of the anhydride acyl groups present in a given anhydride polymer can be converted to amide groups by the method of this invention.

The thermally reversible aqueous gels embodied in this invention are prepared by mixing a polymeric amide of the types herein disclosed with water at a pH of from about 6 to 10. The free carboxyl groups of the polymeric amide may be neutralized with a neutralizing agent prior to, during or after the mixture of the polymeric amide with water. The thermally reversible gels are preferably prepared by heating the aqueous solution or dispersion of neutralized polymeric partial amides embodied herein to a temperature of from about 30° C. to about 100° C. and preferably from about 40° C. to about 80° C. for a short time followed by cooling to room temperature or below.

The polymeric partial amides of this invention are most effective in producing thermally reversible gels in concentrations of at least about 1%.

The neutralizing agents useful in this invention include alkaline inorganic and organic compounds. The preferred neutralizing agents are the alkali metal and alkaline earth metal bases, ammonia and primary, secondary and tertiary aliphatic amines. The most preferred neutralizing agents for the purpose of this invention are the alkali metal and alkaline earth metal hydroxides such as lithium hydroxide, sodium hydroxide, potassium hydroxide, cesium hydroxide, calcium hydroxide, barium hydroxide and magnesium hydroxide; ammonia and ammonium hydroxide, and primary and secondary aliphatic amines such as methyl amine, ethyl amine, n-propyl amine, isopropyl amine, n-butyl amine, isobutyl amine, sec-butyl amine, tert-butyl amine, dimethyl amine, diethyl amine, the di-propyl amines, the dibutyl amines, methyl butyl amine, trimethyl amine, triethyl amine and the like and others.

The polymeric partial amide compositions of this invention are usually isolated by precipitation with an excess of dilute acid.

The polymeric partial amide compositions of this invention are useful as emulsion stabilizers, in coating and adhesive formulations and as gelatin substitutes in sensitized photographic films and printing papers.

In the following illustrative examples the amounts of ingredients are expressed in parts by weight unless otherwise indicated.

Example I

To a mixture of about 10% glacial acrylic acid and 90% benzene was added a mole of acetic anhydride for each mole of acrylic acid. Sufficient benzoyl peroxide was added to provide a concentration of 2% based on the acrylic acid. Air was swept out of the polymerization flask with nitrogen, the flask was sealed and the temperature was adjusted to 50° C. After about 16 hours the reaction was complete and the linear polyacrylic acid formed as a white, fluffy powder suspended in benzene. The polymer was filtered, washed with benzene and then dried in a vacuum oven at 50° C.

A polyacrylic anhydride prepared in the above manner having a molecular weight of about 90–100,000 was converted to a partial amide in the following manner. 25 parts of polyacrylic anhydride were dissolved in about 400 parts of distilled dimethyl formamide by heating the mixture at 75–80° C. for a few minutes. 21.5 parts of recrystallized 2-aminothiazole were then added to the solution and the reaction mixture was stirred at 100° C. for about 6 hours. The soluton was then cooled and poured into 2 liters of water with simultaneous vigorous agitation. The crude precipitate was isolated by filtration and was given washings with water, water containing a trace of hydrogen chloride and finally three washings with acetone. The product weighed 33.5 parts after vacuum drying. The product was found by Kjeldahl analysis to contain 10.96% nitrogen.

A 3% solution of the polymeric product was prepared by mixing 1 g. of polymer, 1.75 ml. of 5% sodium hydroxide solution and 30.5 ml. of distilled water. The polymer was suspended in the water on a steam bath and the alkali was added slowly with stirring. The resulting clear, fluid solution set up to a gel when it was cooled below about 45° C. The gel again became fluid when it was heated above 45° C.

In like manner 5 and 10% solutions of the polymeric product described above were prepared and extremely stiff gel resulted upon cooling. The polymeric product is also an excellent adhesive for wood-to-wood. A 10% solution of this polymeric N-2-thiazylamide at 50° C. was applied between two thin white pine wood strips and the surfaces were forced together with a series of C clamps. The resulting structure was dried in a 130° C. oven for about 15 minutes. Upon removal of the C clamps and cooling excellent adhesion of white pine-to-white pine was observed. One such assembly upon immersion in 90° C. water for 45 minutes gave 15% wood break and no fracture of the adhesive to wood bond.

When the reaction of the polyacrylic anhydride and 2-aminothiazole described above was repeated with a 3 hour reaction period a product resulted which formed a reversible gel in water at 3% polymer concentration. Polvmers of the above-described type having as little as 2.5% by weight of N-2-thiazylamide in them exhibited thermal reversibility when dissolved in water in the sodium salt form.

Example II

In a manner similar to that described in Example I a solution of 50 parts of a polyacrylic anhydride, having a molecular weight of about 185,000, in 1,000 parts of freshly distilled dimethyl formamide was treated with 44 parts of 2-aminothiazole and the resulting mixture was stirred for 4 hours at 95–100° C. The solution was then cooled to 30° C. and was poured slowly into an excess of rapidly agitated water containing hydrochloric acid. The crude, solid product was washed three times with acetone and was dried yielding 71 parts of amide containing 9.73% nitrogen, 8.58% sulfur and 5.49 milliequivalents per gram of carboxyl. The amide polymer formed reversible gels in water similar to those of Example I. The substitution of 2-aminooxazole and 2-aminoimidazole for the 2-aminothiazole in the above procedure resulted in polymers showing thermal reversibility in water.

Example III

The procedure of Example I was repeated using a polyacrylic anhydride prepared from acrylic anhydride monomer in benzene as described in Example I. The partial amide product was found to contain 10.25% nitrogen and a mixture of 2 parts of polymeric N-2-thiazylamide, 3.5 parts of 10% sodium hydroxide solution and 61 parts of water resulted in a thermally reversible gel.

Example IV

The polymeric amide described in Example I was divided into portions of 2.26 parts each and each portion was added to 50 parts of water on a steam bath. The various polymer-water mixtures were neutralized, each with one of the following amines.

| Solution | Amine |
|---|---|
| A | 1.29 parts dibutyl amine. |
| B | 0.73 parts n-butyl amine. |
| C | 1.05 parts diethanol amine. |
| D | 1.30 parts triethanol amine. |

Each of the above heated solutions was clear and fluid at the steam bath temperature and each became gelled upon cooling. In a similar manner thermally reversible gels were prepared from the polymeric N-2-thiazylamide and calcium hydroxide, barium hydroxide, lithium hydroxide and potassium hydroxide.

Example V

A solution of the ammonium salt of the polymeric N-2-thiazylamide described in Example I was prepared by mixing 5 parts of polymeric N-thiazylamide with 100 parts of water containing 2.5 parts of ammonium hydroxide on a steam bath. The viscosity of the hot solution could not be measured with the Brookfield Helipath viscometer. A viscosity reading in excess of 500 units on the Brookfield was obtained upon cooling the solution to room temperature.

I claim:

1. The polymer having a plurality of

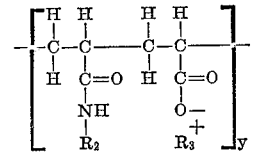

units, wherein $R_2$ represents a 2-thiazyl group; $R_3$ is a member selected from the group consisting of hydrogen, alkali metal, ammonium, monoalkyl ammonium, dialkyl ammonium, monohydroxy alkyl ammonium, di(hydroxyalkyl)ammonium and tri(hydroxyalkyl)ammonium cation and $y$ is a whole number greater than one, the remainder of the polymer units being at least one member selected from the group consisting of

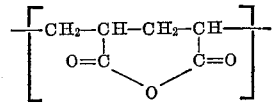

and

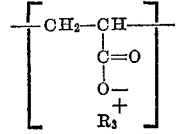

wherein $R_3$ has the foregoing designation, said polymer being characterized by its ability to form thermally reversible gels in water.

2. The method for preparing a polymer containing a plurality of amide groups and a plurality of carboxyl groups characterized by the fact that it forms thermally reversible gels in water said method comprising mixing a linear anhydride polymer having the recurring unit structure

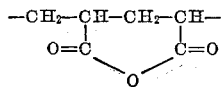

with a 2-aminothiazole and heating the mixture at a temperature of from about 25° C. to about 100° C.

3. The method for preparing a polymer containing a plurality of amide groups and a plurality of carboxyl groups characterized by its ability to form thermally reversible gels in water said method comprising heating a mixture of linear polyacrylic anhydride and a 2-aminothiazole in a polar organic solvent at a temperature of from about 50° to about 100° C.

4. A thermally reversible gel comprising a solution of a major proportion of water and a minor proportion of a polymer having a plurality of $$\left[ \begin{array}{c} -CH_2-CH-CH_2-CH- \\ \phantom{-}C=O \phantom{xxx} C=O \\ \phantom{-}NH \phantom{xxxx} O- \\ \phantom{-}R_2 \phantom{xxxxx} R_3^+ \end{array} \right]_y$$

units, wherein $R_2$ represents a 2-thiazyl group; $R_3$ is a member of the group consisting of hydrogen, alkali metal, ammonium, monoalkyl ammonium, dialkyl ammonium, monohydroxy alkyl ammonium, di(hydroxyalkyl)ammonium and tri(hydroxyalkyl)ammonium cation and $y$ is a whole number greater than one, the remainder of the polymeric units being at least one member selected from the group consisting of

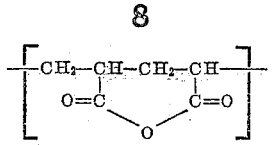

and

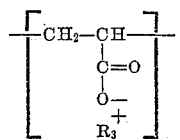

wherein $R_3$ has the foregoing designation said solution having a pH of from about 6 to about 10.

5. The polymer of claim 1 wherein $R_2$ is the

radical and $R_3$ is hydrogen.

6. The thermally reversible gel of claim 4 wherein $R_2$ is the

radical and $R_3$ is hydrogen.

7. The method of claim 3 wherein the polar organic solvent is dimethyl formamide.

References Cited in the file of this patent
UNITED STATES PATENTS

| | | |
|---|---|---|
| 2,313,565 | McDowell et al. | Mar. 9, 1943 |
| 2,643,990 | Ham | June 30, 1953 |
| 2,825,715 | D'Alelio | Mar. 4, 1958 |
| 2,825,716 | D'Alelio | Mar. 4, 1958 |
| 2,834,757 | D'Alelio | May 13, 1958 |